INVENTORS
Torsten Lindbom
Fred W. Diesing
BY
ATTORNEYS

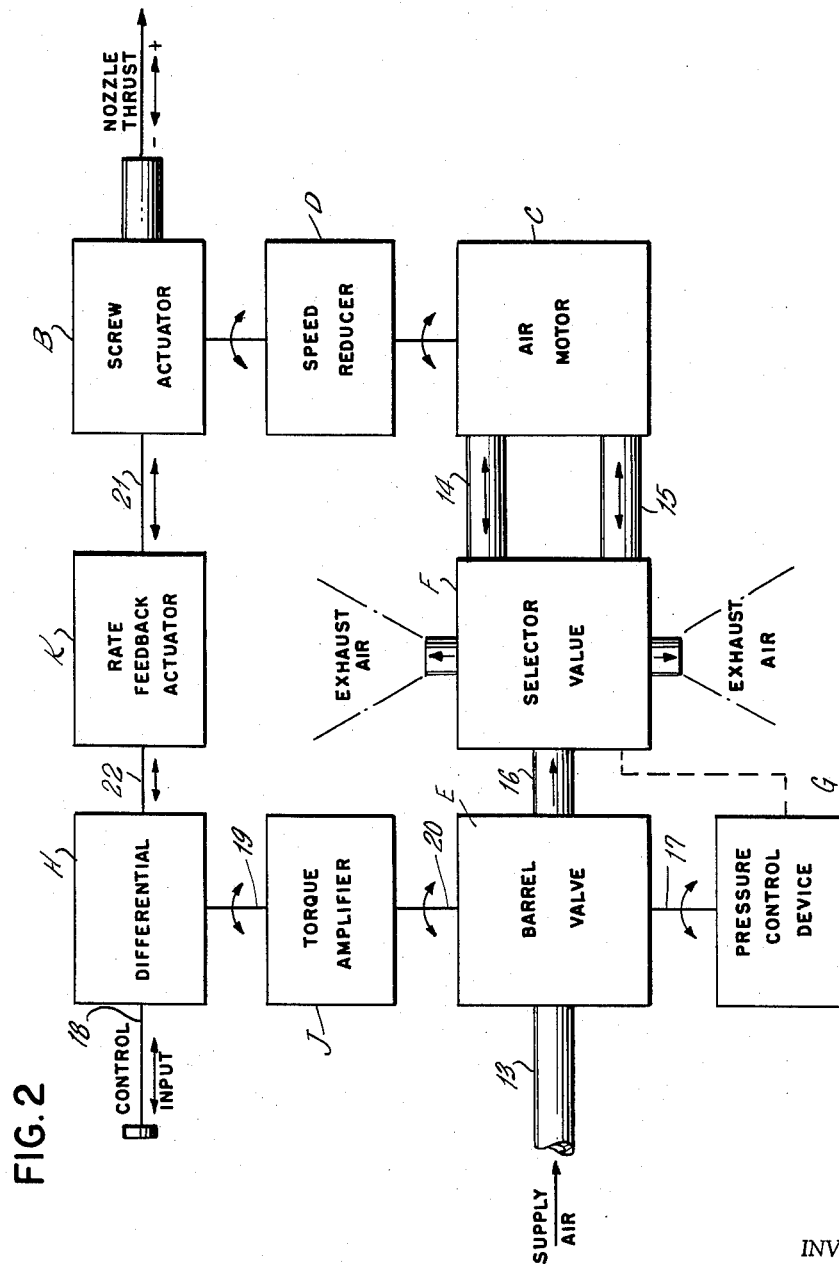

Oct. 3, 1961  F. W. DIESING ET AL  3,002,500
PRESSURE CONTROL SYSTEM FOR REGULATING THE
POSITION OF A CONTROL SURFACE
Filed Jan. 27, 1958
6 Sheets-Sheet 3
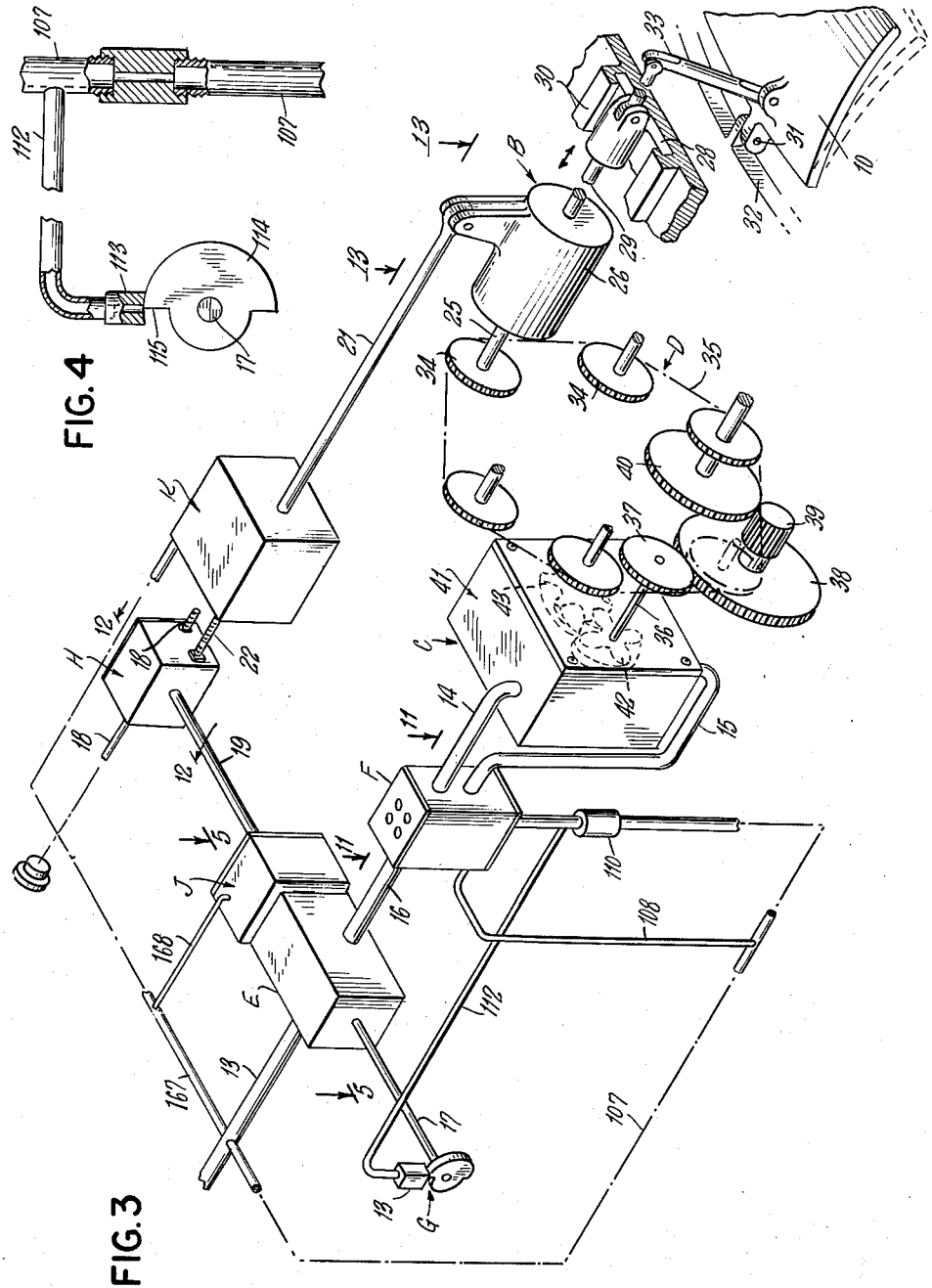
INVENTORS
Torsten Lindbom
Fred W. Diesing
BY
ATTORNEYS Oct. 3, 1961    F. W. DIESING ET AL    3,002,500
PRESSURE CONTROL SYSTEM FOR REGULATING THE
POSITION OF A CONTROL SURFACE
Filed Jan. 27, 1958    6 Sheets-Sheet 4

INVENTORS
Torsten Lindbom
BY Fred W. Diesing

ATTORNEYS

Oct. 3, 1961     F. W. DIESING ET AL     3,002,500
PRESSURE CONTROL SYSTEM FOR REGULATING THE
POSITION OF A CONTROL SURFACE
Filed Jan. 27, 1958     6 Sheets-Sheet 5
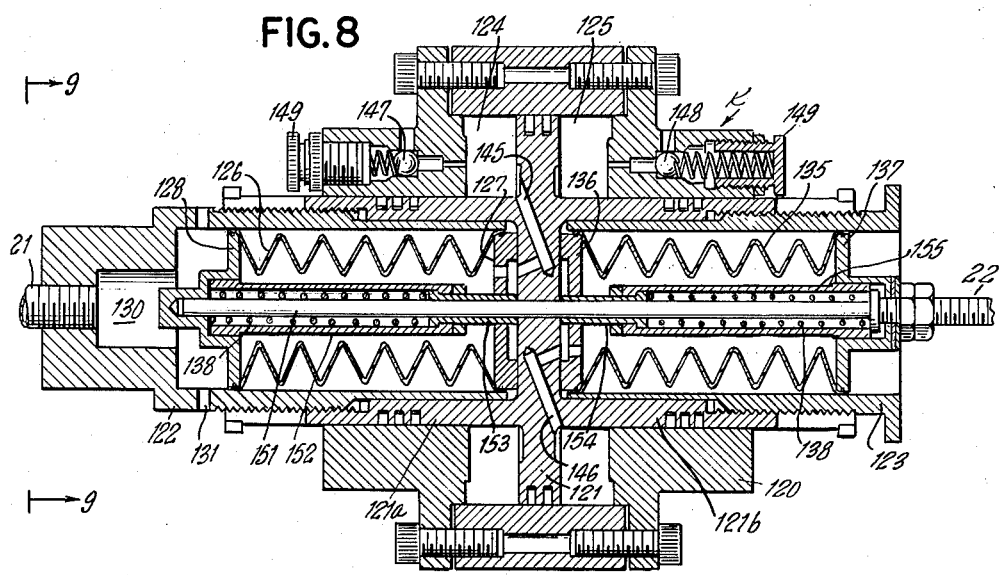
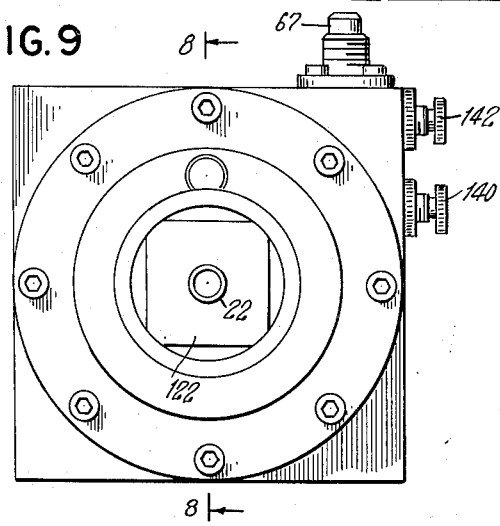
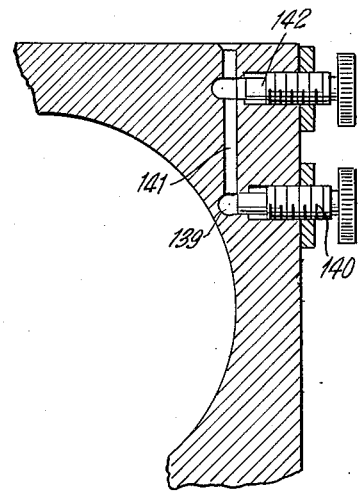
INVENTORS
Torsten Lindbom
Fred W. Diesing
BY
ATTORNEYS Oct. 3, 1961 F. W. DIESING ET AL 3,002,500
PRESSURE CONTROL SYSTEM FOR REGULATING THE
POSITION OF A CONTROL SURFACE
Filed Jan. 27, 1958 6 Sheets-Sheet 6

INVENTORS
Torsten Lindbom
Fred W. Diesing
BY
ATTORNEYS

United States Patent Office 3,002,500
Patented Oct. 3, 1961

3,002,500
PRESSURE CONTROL SYSTEM FOR REGULATING THE POSITION OF A CONTROL SURFACE
Fred W. Diesing, East Williston, and Torsten Lindbom, Blue Point, N.Y., assignors to Fairchild Stratos Corporation, a corporation of Maryland
Filed Jan. 27, 1958, Ser. No. 711,279
8 Claims. (Cl. 121—41)

This invention relates to control systems generally and, more particularly, to a control system for regulating the position of a control surface.

The control system of the present invention has a general application, but it is, nevertheless, particularly suited for the regulation of control surfaces which are required to be adjusted in a relatively moving fluid stream, such as, for example, the control surfaces of an airplane which are exposed to the slipstream, or the control surfaces in communication with the exhaust gases of a jet engine. The control system of the present invention is capable of providing precision adjustment of such control surfaces, regardless of whether the control surface is moving with or against the pressure exerted by the relatively moving fluid, and for maintaining the control surface in the desired position of adjustment even though the control surface is subjected to high and variable forces exerted by the relatively moving fluid.

Another aspect of the present invention lies in the particular application of this control system to the regulation of the size or effective cross-sectional area of the exhaust passage of a jet propulsion engine. This, in effect, provides the turbo-jet engine with a variable exhaust nozzle. In the usual construction of aircraft turbo-jet powerplants, a compressor is used to supply pressurized air to a combustion chamber in which the motive fluid is generated. The thrust of the turbo-jet engine, therefore, depends upon the rate of combustion, the rotational speed of the turbine and the compressor, and the mass and velocity of the motive fluid exhausted. By providing a variable exhaust nozzle to engines of this type, it is possible to maintain a relatively constant rotational speed of the turbine and compressor without sacrificing flexibility in aircraft and engine performance. Sudden variations in thrust demand can be obtained by changing the effective cross-sectional area of the nozzle to thereby control the velocity of the exhaust fluid. By proper regulation of the exhaust nozzle, for example, it is possible to further reduce the thrust of the engine at cruising speeds of the aircraft, or while standing still or taxiing. In addition, by regulation of the exhaust nozzle, it is possible to reduce the exhaust area for take-off to obtain greater thrust or, when cruising, to obtain maximum thrust and engine temperature for a given rotational speed and rate of fuel consumption.

It should, of course, be understood that the exhaust nozzle is applicable directly to the engine or to the afterburner of the engine. Turbo-jet engines are sometimes equipped with afterburners to augment thrust. In such engines, the use of a variable nozzle is required to avoid overheating and perhaps ultimate destruction of the turbin due to overheating.

In the specific embodiment described herein, the variable nozzle of the turbo-jet engine is defined by a plurality of adjustable flaps or gates arranged in a closed array, and these flaps or gates are adapted to be adjusted in unison to permit the size of the exhaust passage to be varied by the operation of the above-mentioned control system. This control system permits precision adjustment of the variable nozzle of the turbo-jet engine, notwithstanding the high heat and pressure of the exhaust fluid, and notwithstanding variations in the pressure of the exhaust fluid.

For a complete understanding of the present invention, reference may be made to the detailed description which follows, and to the accompanying drawings, in which:

FIGURE 2 is a schematic representation of the control system;

FIGURE 3 is a schematic perspective view of the control system;

FIGURE 4 is an enlarged detailed view, partly in cross-section, of a control valve which is part of the system illustrated in FIGURE 3;

Figure 5:
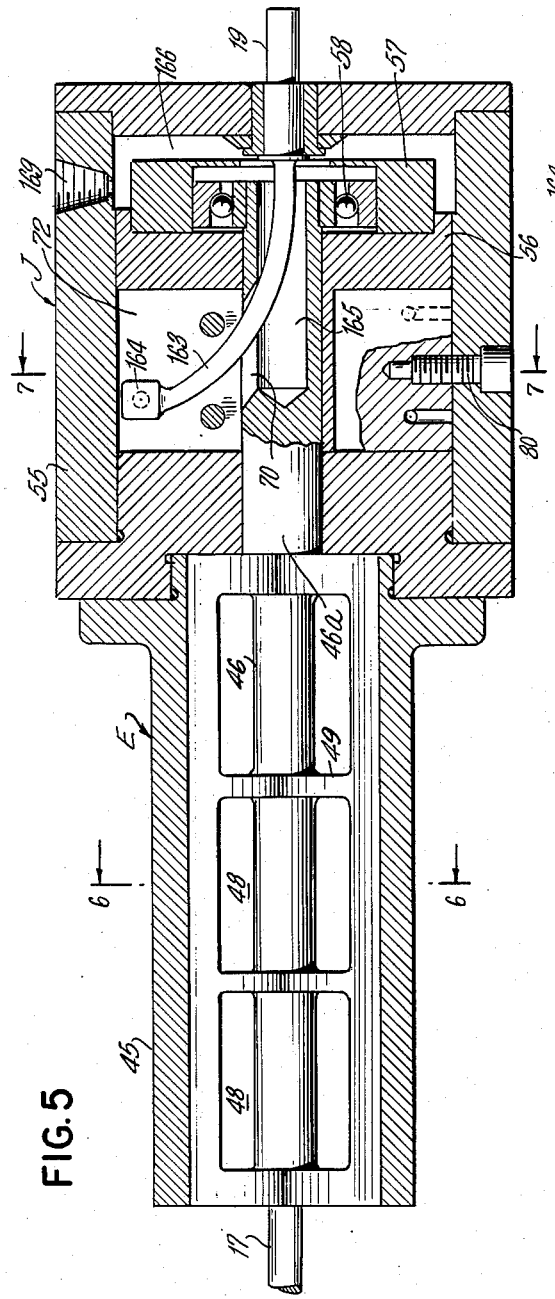
FIGURE 5 is an enlarged cross-sectional view of a structure which houses a barrel valve and a torque amplifier, both components of the control system illustrated in FIGURE 3.
Figure 7:
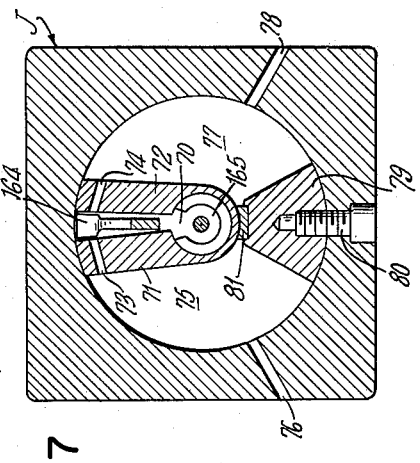
Figure 6:
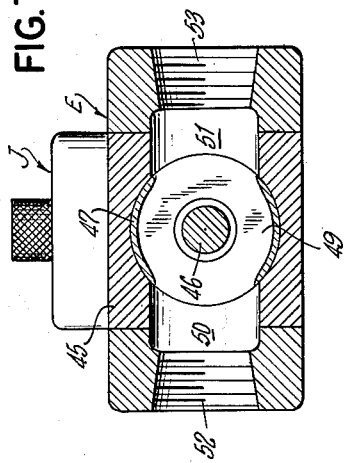
Figure 11:
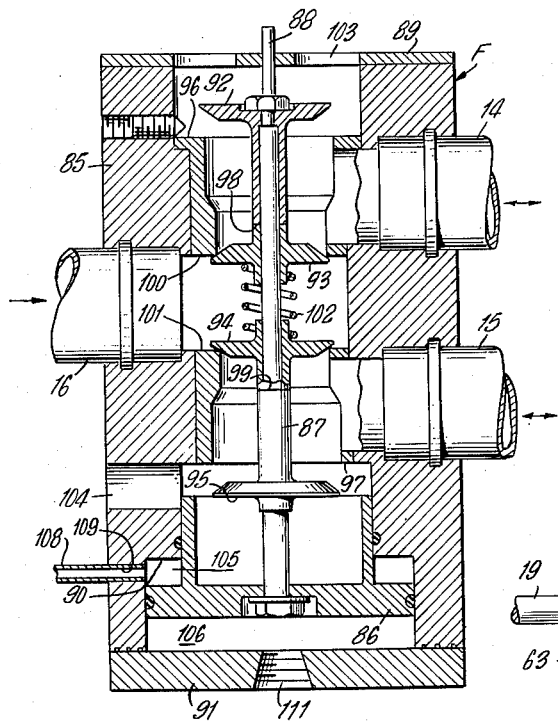
Figure 12:
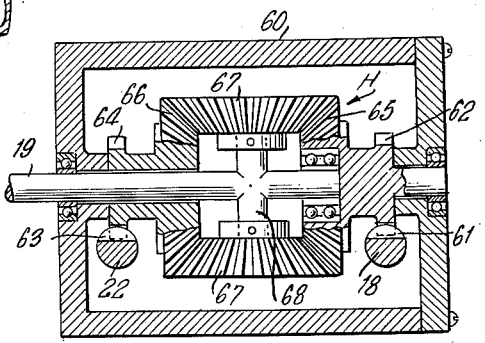
Figure 13:
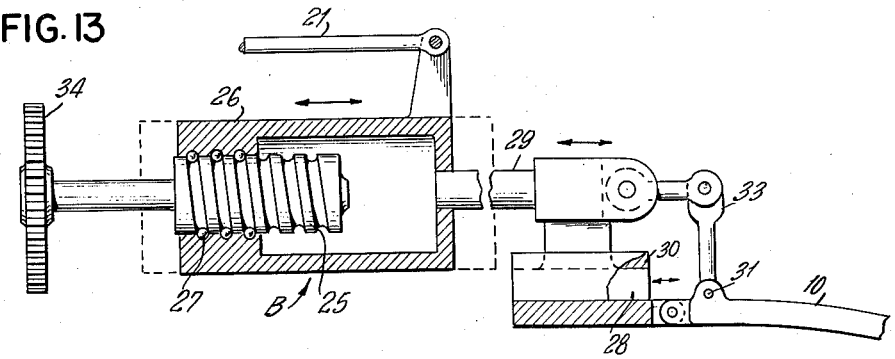

FIGURES 6 and 7 are cross-sectional views, taken along the lines 6—6 and 7—7, respectively, of FIGURE 5, looking in the direction of the arrows;

FIGURE 8 is an enlarged cross-sectional view of a feedback actuator which forms part of the control system illustrated in FIGURE 3; it is taken along the line 8—8 of FIGURE 9, looking in the direction of the arrows;

FIGURE 9 is an end view of the structure illustrated in FIGURE 8 as seen from the line 9—9 of FIGURE 8, looking in the direction of the arrows;

FIGURE 10 is a fragmentary cross-sectional end view of part of the structure shown in FIGURE 8;

FIGURE 11 is a cross-sectional elevational view of a selector valve unit which forms part of the control system illustrated in FIGURE 3;

FIGURE 12 is a cross-sectional plan view of a gear system which forms part of the control system shown in FIGURE 3; and FIGURE 13 is a cross-sectional view of an actuating mechanism which regulates the position of one of the flaps which form the exhaust passage of the jet engine.

Figure 1:
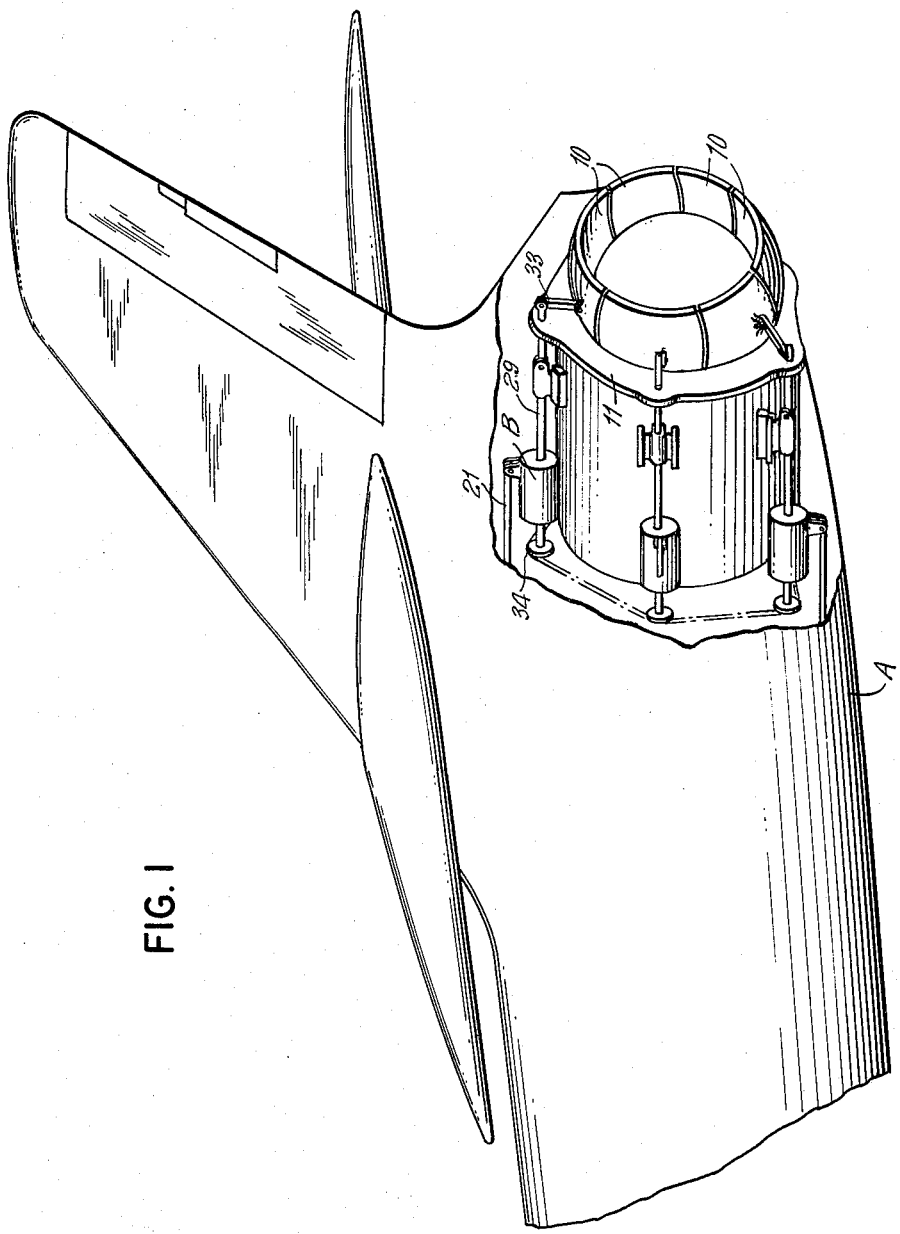
FIGURE 1 is a perspective view of the tail section of a jet propelled aircraft with a portion broken away to show the present invention.

Referring to FIGURE 1 of the drawings, the tail section of a jet propelled airplane A is broken away to show that the extreme discharge end of the exhaust passage of the engine is formed by a plurality of pivotal flaps 10 arranged in a closed array, preferably a circular array. These flaps are arranged behind a fire wall 11, and each flap is separately, pivotally mounted in such a manner that the free end thereof is movable toward and away from the center axis of the exhaust passage. Each flap is adapted to be regulated by a separate actuating mechanism B. As shown in FIGURE 3, all of the actuating mechanisms B are operated by a gas-driven motor C through a speed reducing drive transmission system D.

The control system is shown schematically in FIGURE 2 of the drawings. The motor C is driven by a fluid under pressure supplied through a conduit 13. The conduit can be in communication with any source of fluid under pressure, but a convenient source of fluid is bleed air from the intake of the jet engine.

The air which drives the motor C is metered or throttled by a barrel-type valve E and channeled by a selector valve F to the motor either through the conduit 14 or through the conduit 15. A conduit 16 connects the barrel valve with the selector valve. If the air is directed to the motor via the conduit 14, it returns via the conduit 15 and is exhausted to atmosphere from the selector valve. If it is directed to the motor via the conduit 15, it returns via the conduit 14 and is exhausted to atmosphere from the selector valve. The path of flow of the air through the motor determines the direction of drive of the motor, and this, in turn, determines whether the motor imparts an opening or closing pivotal motion to the flaps 10.

The selector valve is adjusted by a pressure control device G. The pressure control device, in turn, is mechanically connected by a rotatable shaft 17 to the barrel valve.

The barrel valve is controlled by the actuation of a control rod 18 which is adjusted manually. The adjustment of the control rod 18 is translated into a corresponding adjustment of the barrel valve by a series of components which include a differential gear system H, a shaft 19, a torque amplifier J, and a shaft 20. The purpose of the torque amplifier is to develop pneumatically ample torque to rotate the barrel valve E and to adjust the pressure control device G.

The system also includes a rate feedback actuator K which is connected by a connecting link 21 to the screw actuator B and by a connecting link 22 directly to the shaft 19 and through the differential gear system to the control rod 18. The purpose of the feedback actuator is to sense the direction and rate of movement of the screw actuator and to impart different characteristics to the movement of the flaps 10 in accordance with the direction and rate of movement of the flaps, thereby affording controlled adjustment, avoiding or limiting overshoot, and affording increased stability to the flap in its adjusted position, notwithstanding variations in the pressure exerted against the flap by the pressure of the exhaust gases.

Turning now to a more detailed description of the screw actuator B, as best shown in FIGURES 3 and 13, the actuator is essentially a screw jack comprising a rotatable screw 25 and an axially movable housing 26. To reduce friction, ball bearings 27 are accommodated within the threaded coupling between the screw and the housing. The link 21 connects the housing with the feedback actuator K. The housing is connected to a slide 28 by means of a connecting rod 29, and the slide is accommodated in a guide 30 for fore-and-aft movement. The flap is pivoted on a shaft 31 to a supporting structure 32 outside the exhaust passage of the jet engine, and the flap is connected to the slide by a linkage, generally designated 32. Thus, the rearward displacement of the housing 26 imparts a closing movement to the corresponding flap, and a forward displacement of the housing imparts an opening movement to the corresponding flap.

A sprocket 34 is affixed to the forward end of the screw 25, and rotation is imparted to all of the screws 25 of all the actuators in unison by an endless chain 35. The endless chain, in turn, is driven from the drive shaft 36 of the motor C by a gear transmission system which includes the gears 37, 38, 39 and 40.

The motor C comprises a housing 41 and two close-fitting helical rotors 42 and 43 rotatably mounted within the housing. When air under pressure is directed into the upper portion of the housing through the conduit 14, the passage of the expanding air between the rotors drives the rotors in one direction, thereby imparting motion to the flaps 10 to reduce the size of the exhaust passage. On the other hand, when the air under pressure is directed into the lower portion of the housing through the conduit 15, the passage of the expanding air between the rotors drives the rotors in the other direction, thereby imparting motion to the flaps 10 to enlarge the size of the discharge opening.

As explained above, the air under pressure which drives the motor C is supplied through the conduit 13, the barrel-type valve E, the conduit 16, and the selector valve F to either the conduit 14 or the conduit 15, depending on the control function initiated.

Referring to FIGURES 5 and 6, the barrel valve comprises generally a hollow housing 45, a rotatable shaft 46 within the housing, and a valve sleeve 47 supported on the shaft 46. The valve sleeve contains a plurality of passages 48 therethrough, separated by webs or partitions 49. As shown in FIGURE 6, the passages 48 serve to connect an upstream chamber 50 with a downstream chamber 51. The chamber 50 communicates with the conduit 13 through a port 52, and the chamber 51 communicates with the conduit 16 through a port 53. The barrel valve functions as a metering or throttling valve to regulate the flow of air from the supply conduit 13 to the motor C via the selector valve F, and this is accomplished by the rotation of the valve sleeve 47 relative to the housing.

The valve sleeve 47 is provided with an extension shaft 46a which extends into the housing 55 of the torque amplifier unit J, which housing is adjacent the housing 45. The housing 55 is separated by a partition wall 56. A supporting member 57 for a bearing 58 is affixed to one side of the partition wall.

The barrel-type valve is adjusted with the assistance of the torque amplifier by the manually operated control rod 18. Assuming for purposes of illustration that the operation is manual, the pilot or other operator adjusts the control rod 18 to a position which corresponds to the particular adjustment of the flaps 10 desired. The control rod is locked in this adjusted position by friction or by suitable means, such as a spring detent. The control rod, as best shown in FIGURE 12, extends through aligned openings in the opposite sides of a housing 60, which aligned openings serve to guide the control rod for axial movement. The upper surface of the control rod is formed with rack teeth 61 which mesh with the teeth of a pinion 62. The connecting link 22 also extends through aligned openings in the opposite sides of the housing 60, and the upper surface of the link 22 is formed with rack teeth 63 which mesh with the teeth of a pinion 64. A bevel gear 65 is formed integrally with the pinion 62, and a bevel gear 66 is formed integrally with the pinion 64. Beveled planetary gears 67 are rotatably mounted to opposite ends of the cross-shaft 68 of the shaft 19, which gears 67 mesh with the bevel gears 65 and 66.

Inasmuch as there is resistance of the movement of the feedback link 22 unless the flaps 10 are being adjusted, the bevel gear 65 of the planetary gear system is held stationary. Therefore, a movement of the control rod 18 will impart rotation to the shaft 19 through the rotation of the bevel gear 65 and the travel of the planetary gears 67 about the axis of rotation of the shaft 19. This rotation of the shaft 19 will initiate the operation of the flaps 10, and as the flaps 10 move axial movement will be imparted to the feedback link 22. Since the control rod 18 is held frictionally in its adjusted position and is therefore fixed, the movement imparted to the link 22 will impart movement to the planetary gears 67 and the shaft 19, thereby restoring the shaft 19 to its initial position when the flaps 10 are adjusted to a position which corresponds to the position of adjustment of the control rod 18. Furthermore, in the event of variations in the exhaust fluid which tend to change the position of adjustment to the flaps, a corrective movement will be imparted to the feedback link 22, which, in turn, will be transmitted to the barrel valve. The resulting adjustment of the barrel valve will cause the necessary correction force to be applied to the flaps.

The opposite end of the shaft 19 extends into the housing 55 of the torque amplifier J, and it carries a curved arm 163 which terminates in a flow metering head 164. The arm 163 passes through a hollow bore 165 in the end of the shaft 46a and a slot 70 in the shaft, supporting the head 164 between two spaced apart vanes 71 and 72 affixed to the shaft 46a. Thus, the axial adjustment of the control rod 18 imparts rotation to the shaft 19 which moves the head 164 of the arm 163 toward the vane 71 or the vane 72.

As best shown in FIGURE 7, the vanes 71 and 72 are provided with orifices 73 and 74, respectively, therethrough. The passage 73 leads into a chamber 75, which chamber is vented to atmosphere by a restricted passage 76. The passage 74 leads into a different chamber 77, which chamber is vented to atmosphere by restricted passage 78. The chambers 75 and 77 are separated by the vanes 71 and 72 and by the supporting segment 79 affixed in position by the screw 80. The upper edge of the segment 79 has a sealing element 81 inset therein which helps isolate the chambers 75 and 77 without unduly impeding the pivotal rotation of the shaft 46a and the vanes 71 and 72 affixed thereon.

Air is supplied to the space between the vanes 71 and 72 from the chamber 166 on the other side of the partition wall 56 through the hollow bore 165 and the slot 70. The air is supplied to the chamber 166 from the main supply conduit 13 through the branch conduits 167 and 168 and through the port 169 in the housing 55. This air flows from the space defined between the vanes 71 and 72 through the orifices 73 and 74 into the vented chambers 75 and 77. This flow of air tends to maintain the inner surfaces of the vanes equally spaced from the flow metering head 164 of the arm 163. Thus, when the control rod 18 is adjusted, moving the flow regulating head 164 toward either the vane 71 or the vane 72, this adjustment of the flow regulating head creates a differential pressure on opposite sides of the head which produces a rotational torque on the shaft 46a. This torque, in turn, results in an angular displacement of the vanes 71 and 72 as a unit, to a position at which the vanes are again equally spaced from the head 164. Thus, the torque amplifier brings into play the high pressure of the fluid in the supply line 13 against the vane through which the flow has been reduced, thereby exerting a high rotational torque on the rotatable valve sleeve 47. This rotation of the valve sleeve 47, as explained above, brings about a change in the rate of flow of the fluid from the supply line 13 to the conduit 16.

The selector valve F, as best shown in FIGURE 11, comprises a housing 85 containing a vertically movable piston 86 therein. The piston has a piston rod 87 affixed thereto and upstanding therefrom. The extreme upper end of the piston rod carries an upwardly projecting rod 88 which passes through an opening in the cover 89 of the housing, thereby guiding the upper end of the rod for axial movement within the housing.

The lower end of the piston is of larger effective cross-sectional area than the upper end of the piston. Thus, the piston bore is formed with a step or shoulder 90 which divides the larger part of the bore from the smaller part. The lower end of the piston bore is closed by an end cover 91.

The rod 87 carries valves 92, 93, 94 and 95 thereon. The valve 92 is fixed to the rod and, in the normal position of the rod, it is spaced apart from and above its valve seat 96. The valve 95 is likewise fixed to the rod, and it is normally spaced apart from and below its valve seat 97. The valves 93 and 94 are slidably mounted on the rod. The movement of the valve 93 relative to the rod in one direction is limited by a shoulder 98 of the rod, and movement of the valve 94 relative to the rod in the other direction is limited by a shoulder 99 of the rod. When the piston 86 is in its normal position of equilibrium, the valves 93 and 94 are urged apart and in engagement with their respective valve seats 100 and 101 by a compression spring 102 accommodated on the rod and acting between the valves 93 and 94.

Since the valve 93 is interposed between the conduits 16 and 14 and the valve 94 is interposed between the conduits 16 and 15, when these valves are closed no fluid is supplied to the motor C; hence, the motor C is idle. However, if the rod 87 is lifted upwardly from its normal position of equilibrium, the valve 94 is unseated, establishing a flow of air from the conduit 16 to the conduit 15, driving the motor C in one direction. On the other hand, if the rod is moved downwardly from its normal position of equilibrium, the valve 93 is unseated, establishing a flow of air from the conduit 16 to the conduit 14, driving the motor C in the reverse direction. When the valve 94 is unseated, the air which drives the motor C is supplied through the conduit 15, and it is returned from the motor C by the conduit 14 to the interior of the housing 85 between the open valve 92 and the closed valve 93. The valve 92 being open, the exhaust air thus returned is discharged to atmosphere through the perforations 103 in the cover 89. When the valve 93 is unseated, the air which drives the motor C is supplied through the conduit 14, and it is returned from the motor C by the conduit 15 to the interior of the housing 85 between the closed valve 94 and the open valve 95. This return exhaust air is vented to atmosphere through the passage 104.

The above-described unseating of the valves 93 and 94 is controlled by the movement of the piston 86. The displacement of the piston 86 from its neutral position, in turn, is regulated by the control valve G.

More specifically, referring to FIGURE 11, the piston 86 divides the piston bore into an upper chamber 105 and a lower chamber 106.

The chamber 105 is connected to the main air supply line 13 by branch conduits 107 and 108 connected in series. Air is admitted into the chamber 105 through a port 109. The lower chamber 106 is connected to the main air supply line 13 by the branch conduit 107 which contains a restricted orifice 110 (see FIGURE 4) therein, and by a port 111 in the bottom wall 91 of the selector valve housing.

A bleed conduit 112 is connected to the conduit 107 between the restricted orifice 110 and the port 111. The opposite end of this conduit is provided with a nozzle 113 which exhausts to atmosphere. The rate of bleed of air through the nozzle 113 is controlled by a rotatable cam 114 fixedly mounted on the shaft 17. The cam 114 is semi-circular, being formed with a relatively steep shoulder 115 which is movable relative to the concave lower surface of the nozzle 113 to regulate the rate of flow of air therethrough. When the cam 114 is in the position illustrated in FIGURE 4, that is to say, in the intermediate position across the nozzle passage, back pressure is built up in the conduit 112 and in the chamber 106 below the piston 86. This maintains the piston 86 in its neutral position. When the cam 114 is rotated to bring the raised portion of the cam across the discharge end of the nozzle, the exhaust of the air to atmosphere is reduced and ultimately virtually cut off, thereby increasing the back pressure in the conduit 112 and the pressure within the chamber 106. On the other hand, when the cam is rotated in the opposite direction to move the raised part of the cam out of engagement with the nozzle, a maximum bleed of air is permitted through the conduit 112, producing a minimum pressure in the chamber 106 beneath the piston. Thus, the piston is raised or lowered within the housing 85 to initiate the operation of the air motor C, depending upon the direction of rotation of the cam 114 relative to the nozzle 113. The cam 114, in turn, is adjusted in unison with the valve E, being connected thereto, as explained above, by the shaft 17.

In order to make possible the precise adjustment of the nozzle flaps 10 under the control of the adjustable rod 18, it is necessary to compensate for the tendency of the mechanism to override the desired position. The feedback actuator K shown in FIGURES 8 to 10, inclusive, serves to sense the direction rate of movement of the flap and to relay this into information back to the adjustable control rod 18 through the differential gear system H.

The feedback actuator K, as best shown in FIGURE 8, comprises generally a housing 120 and a piston 121 which is movable relative to the housing 120. The housing 120 contains a circular bore therethrough in which the tubular portions 121a and 121b of the piston are guided. The tubular portion 121a of the piston accommodates a tubular housing 122 therein, and the tubular portion 121b of the piston accommodates a tubular housing 123 therein. The housing 122 is threaded to the tubular portion 121a, and the housing 123 is threaded to the tubular portion 121b. In the central portion of the housing 120, the bore is enlarged to accommodate the piston 121 therein. The piston 121 divides this central bore into chambers 124 and 125.

The tubular housing 122 of the piston contains an expandable and collapsible bellows 126 fixed at one end to a fixed disk 127 and at the other end to a disk 128 movable within the housing 122. The extreme end of the tubular housing 122 is connected by means of the rod or link 22 to the differential gear system H. A chamber 130 is formed between the end of the tubular housing 122 and the movable disk 128, and this chamber is vented to atmosphere through the ports 131.

The tubular housing 123 is open at the end, and it accommodates an expandable and collapsible bellows 135 therein which is connected at opposite ends to a disk 136 fixed within the housing 123 and to a disk 137 movable relative to the housing 123.

The chambers 124 and 125 are connected by a by-pass passage 139 (see FIGURE 10). The end of an adjustable screw 140 serves as a valve which regulates the rate of flow through the by-pass passage. A passage 141 communicates with the by-pass passage, and the passage 141 is connected to the high pressure bleed conduit 13 through a conduit 167. The high pressure in this line is admitted to the chambers 124 and 125 to help lock the flaps in their adjusted position. A valve 142 is interposed in the passage 141 to regulate the high pressure bleed into the chambers 124 and 125.

The chamber 124 communicates with the interior of the bellows 126 through a passage 145. Similarly, the chamber 125 communicates with the interior of the bellows 135 through a passage 146. Relief valves 147 and 148 are provided for the chambers 124 and 125, respectively. The spring pressures exerted on the relief valves 147 and 148 can be adjusted by set screws 149. The relief valves are provided only to prevent damage to the parts and, in so far as the operation of the actuator K is concerned, they can be assumed to be closed at all times.

A rod 151 extends entirely through the tubular housing 123 and the piston 121 into the tubular housing 123. One end of the rod 151 is connected to the end of the link 22 and the other end is connected to the disk 128. Telescoping members 152 and 153 are accommodated on the rod within the bellows 126. Also, telescoping members 154 and 155 are accommodated on the rod within the bellows 135. Compression springs 138 are accommodated on the rod 151 and act between the respective telescoping members to expand the bellows 126 and 135, the expanded length of the bellows being determined by the engagement of the shoulders formed on the ends of the telescoping members 152 and 153 and on the ends of the telescoping members 154 and 155.

The disk 128 is affixed to the member 152 and the disk 137 is affixed to the member 155. Therefore, the positions of the members 152 and 155 are fixed on the rod 151. The members 153 and 154, however, are slidable within the disks 127 and 137, respectively, and therefore are slidably mounted on the rod 151. Stated another way, the rod 151 is movable relatively to the disks 127 and 136, but not to the disks 128 and 137.

Actuation of the feedback actuator is such that in the event of a rapid displacement of the link 22 to the left, as viewed in FIGURE 8, the housing 122 is forced to the left, transmitting movement to the piston 121 to the left. This movement of the piston compresses air in the chamber 124, forcing air through the passage 145 into the bellows 126, thereby expanding the bellows against the atmospheric pressure in the chamber 130. As the wall 128 moves to the left, the engagement between the members 152 and 153 moves the member 153 relatively to the wall 137, whereas the members 154 and 155 telescope, compressing the spring 138 therebetween. The expansion of the bellows 126 also moves the rod 151 and the link 22 to the left, the bellows 126 serving as a resilient connection between the links 21 and 22. On the other hand, in the event of a rapid displacement of the link 21 to the right, the piston 121 is forced to the right. This movement of the piston compresses the air in the chamber 125, forcing air through the passage 146 into the bellows 135, which increased air pressure expands the bellows, moving the rod 151 and the link 22 to the right. As the wall 137 moves away from the wall 136, the engagement between the members 154 and 155 moves the member 154 relatively to the wall 136. At the same time, the members 152 and 153 are compressed against the action of the spring acting therebetween.

It is evident that if the link 21 is actuated slowly to the right or to the left, the feedback actuator serves as a direct connection between the links 21 and 22 and the fluid flows from one chamber to the other through the restricted passage 139.

When the flaps 10 are adjusted to the position which corresponds to the displacement of the control rod 18, the resulting displacement of the feedback link 22 restores the barrel valve E to closed position. The manner in which this is accomplished can best be explained by reference to FIGURE 12. The displacement of the link 22 by the movement of the flaps 10 drives the pinion 64 and the bevel gear 66 of the planetary gear system. Since the position of the control rod 18 is locked by the action of the spring urged detent, the bevel gear 65 is locked, permitting the bevel gear 66 to drive the planetary gears 67 about the axis of the shaft 19, thereby rotating the shaft 19 to close the barrel valve E when the flaps 10 have been adjusted to the desired position. This completes the operation of the control system.

The invention has been shown in preferred form and by way of example only, and obviously many variations and modifications may be made therein without departing from the spirit of the invention. The invention, therefore, is not to be limited to any specified form or embodiment, except in so far as such limitations are set forth in the claims.

We claim:

1. A control system comprising a movable element, a displaceable control member, means controlled by the adjustment of the control member for adjusting the position of said movable element, a linkage connected to said movable element, a linkage connected to said control member, and a feedback actuator interposed between said linkages, said feedback actuator including relatively movable piston and cylinder elements, one of said piston and cylinder elements being movable and connected to one of said linkages, the other of said piston and cylinder elements being stationary, mounting means for the stationary element, said cylinder defining a chamber on each side of said piston, a restricted passage connecting the chambers, resilient pressure-actuated means resiliently connecting the movable one of said piston and cylinder elements and the other of said linkages, and thereby also connecting the linkages, and means establishing communication between one of said chambers and said resilient pressure-actuated means so that said pressure-actuated means will be responsive to the pressure in said chamber in the event of an abrupt relative movement between said piston and cylinder, the movement from the linkage connected to the movable element to the other being transmitted through said resilient pressure-actuated means, whereby slow movement of said piston relative to said cylinder will permit the flow of fluid from one chamber to the other through said restricted passage and an abrupt movement of said piston with respect to said cylinder will cause the flow of fluid to act on the resilient pressure-actuated means to change the resiliency of the pressure-actuated means connecting said linkages.

2. A control system as set forth in claim 1 in which the means controlled by the adjustment of the control member includes a fluid-driven reversible motor.

3. A fluid pressure control system as set forth in claim 1 in which the resilient pressure-actuated means is a resilient bellows and in which the feedback actuator includes at least two of said resilient bellows, each in communication with a different chamber and both connected to the same linkage.

4. A control system comprising a movable element, a fluid-driven reversible motor for imparting movement to said movable element, a source of fluid under pressure, a selector valve adjustable to determine the direction of movement of the motor, valve means to control the flow of fluid to the motor through the selector valve, a displaceable control member, and torque amplifying means interposed between the control member and the displaceable valve means, said torque amplifying means including a movable follower having a space defined between a pair of movable walls, means establishing communication between said space and a source of fluid under pressure, passage means through each of said walls, and a movable control head interposed in said space between the passages through the walls and operatively connected to the displaceable control member, whereby the flow of fluid from said space through the passages in said walls maintains the walls of the follower in spaced-apart relation from the control element within the space causing the pressure of the fluid to displace the follower in response to movement of the control element.

5. A fluid pressure control system comprising a movable element, a fluid-driven motor for imparting movement to the element, a displaceable control member, flow regulating means for controlling the rate at which fluid is supplied to the fluid-driven motor, and torque amplifying means for converting an adjustment of the control member into an adjustment of the flow regulating means, the torque amplifying means including a housing, a pair of vanes rotatably mounted within the housing and coupled to the flow regulating means, said vanes being disposed at an acute angle and dividing the housing into two chambers, a vent in each chamber, a movable element interposed between the vanes, passage means connecting the source of fluid under pressure with the space between the two vanes, means connecting the movable element interposed between the vanes with the control member, and exhaust passages in each of the vanes leading to the adjacent chamber, whereby the position of the movable element relative to the vanes disturbs the balance of flow through the exhaust passages in the vanes, producing an angular displacement of the vanes, which displacement is transmitted to the flow regulating means.

6. A control system comprising a movable element defining a surface in communication with a fluid stream, a feedback connection from the movable element, a displaceable control member, means for adjusting the position of said movable element, and a planetary gear system connecting the feedback connection with the position adjusting means and connecting the control member with the position adjusting means, the planetary gear system transmitting movement from the control member to the position adjusting means to initiate an adjustment of the movable element and transmitting movement from the movable element through the feedback connection to the position adjusting means to help maintain the desired adjustment of the movable element, said feedback connection including a stationary housing having a bore therein, a movable piston within the bore and dividing the bore into two chambers, a linkage connected to the movable element, a linkage connected to the planetary gear system, at least two resilient bellows connecting one of the linkages with the piston and being so positioned with respect to said piston and said one of the linkages that one tends to collapse when the linkage is abruptly moved in one direction and the other tends to collapse when the linkage is abruptly moved in the other direction, a passage connecting one of the chambers with the interior of one bellows, and a passage connecting the other of the chambers with the interior of the other bellows, whereby when the movable element is adjusted pressure is transmitted from one of the chambers to one of the bellows to change its inherent resiliency.

7. A control system including a movable element to be controlled, a displaceable control member, means controlled by the adjustment of the control member for adjusting the position of said movable element, a linkage connected with the control member, a linkage connected with the movable element, and feedback means connecting the said linkages and including a stationary housing having a bore therein, a piston movable relative to the bore in the housing, said piston dividing the housing bore into two chambers, an expandable and contractable resilient bellows on each side of the piston, each of said bellows having a movable end and an end fixed to the piston, one of said linkages being connected to the movable ends of the bellows, the other of said linkages being connected to said piston, a passage connecting one of the chambers with the interior of one bellows and a passage connecting the other of the chambers with the interior of the other bellows, whereby motion imparted to one of said linkages is transmitted through the piston and the movable elements of the bellows to the other of said linkages.

8. A control system comprising a movable element, a displaceable control member, means controlled by the adjustment of the control member for adjusting the position of said movable element, a linkage connected to the movable element, a linkage connected to the control member, and a feedback connection between said linkages, said feedback connection comprising relatively movable housing and piston elements, at least one of which is movable relative to the other, mounting means for one of said elements, the housing having a piston bore therein with the piston dividing the bore into two chambers, a restricted passage connecting said chambers, means for introducing a fluid under pressure into both chambers, thereby resisting relative movement between the piston and the housing elements, a pressure-actuated member in communication with one of said chambers, a resilient connection, and means connecting said movable one of said housing and piston elements, the pressure-actuated member and the resilient connection in series between the linkages, whereby slow relative movement between said piston and housing produces a flow of fluid from one chamber to the other through the restricted passage and an abrupt relative movement therebetween in one direction produces a flow of fluid from one chamber to the pressure-actuated member to resist yielding of said resilient connection.

References Cited in the file of this patent

UNITED STATES PATENTS

| 1,063,632 | White et al. | June 3, 1913 |
|---|---|---|
| 2,047,922 | Seligmann | July 14, 1936 |
| 2,236,980 | Ungar | Apr. 1, 1941 |
| 2,278,396 | Saur | Mar. 31, 1942 |
| 2,547,552 | Anderson | Apr. 3, 1951 |
| 2,655,902 | Ziebolz | Oct. 20, 1953 |
| 2,683,348 | Petry | July 13, 1954 |
| 2,718,878 | Du Bois | Sept. 27, 1955 |
| 2,799,250 | Livers | July 16, 1957 |
| 2,813,395 | Meyer | Nov. 19, 1957 |
| 2,820,340 | Dolza et al. | Jan. 21, 1958 |
| 2,820,600 | Brunner | Jan. 21, 1958 |

FOREIGN PATENTS

| 53,192 | Austria | Apr. 25, 1912 |